(12) United States Patent
Ohkubo

(10) Patent No.: US 7,201,076 B2
(45) Date of Patent: Apr. 10, 2007

(54) BALL SCREW

(75) Inventor: Tsutomu Ohkubo, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/168,416

(22) Filed: Jun. 29, 2005

(65) Prior Publication Data
US 2005/0235766 A1 Oct. 27, 2005

Related U.S. Application Data

(62) Division of application No. 10/211,353, filed on Aug. 5, 2002, now Pat. No. 6,925,900.

(30) Foreign Application Priority Data
Aug. 3, 2001 (JP) ............... P2001-236569

(51) Int. Cl.
F16H 27/02 (2006.01)
(52) U.S. Cl. ............... 74/424.75; 74/484.86
(58) Field of Classification Search ............... 74/89.23, 74/424.82, 424.81, 424.75, 424.86
See application file for complete search history.

(56) References Cited

U.S. PATENT DOCUMENTS

| | | | |
|---|---|---|---|
| 2,502,066 A * | 3/1950 | Tanner | 74/424.75 |
| 2,508,261 A | 5/1950 | Hosler | |
| 3,667,311 A | 6/1972 | Wysong | |
| 3,673,886 A | 7/1972 | Tomita et al. | |
| 4,070,921 A | 1/1978 | Arnold | |
| 4,221,137 A | 9/1980 | Futaba | |
| 4,612,817 A * | 9/1986 | Neff | 74/424.75 |
| 4,680,982 A * | 7/1987 | Wilke et al. | 74/424.75 |
| 5,022,277 A | 6/1991 | Shaffer | |
| 5,239,882 A | 8/1993 | Druet | |
| 5,749,265 A | 5/1998 | Namimatsu et al. | |
| 6,584,869 B2 | 7/2003 | Grosspietsch et al. | |
| 6,860,827 B2 * | 3/2005 | Otaki et al. | 474/39 |
| 6,925,900 B2 * | 8/2005 | Ohkubo | 74/424.82 |

FOREIGN PATENT DOCUMENTS

DE 100 22 715 A1 12/2000

* cited by examiner

Primary Examiner—David M. Fenstermacher
(74) Attorney, Agent, or Firm—Sughrue Mion, PLLC

(57) ABSTRACT

The ball screw comprises a shaft including a spiral-shaped shaft groove having a semicircular-shaped (Gothic-arch-shaped) section, a nut including a spiral-shaped nut ball groove which corresponds to the shaft groove and has a semicircular-shaped (Gothic-arch-shaped) section, a large number of balls rotatably fitted into between the nut ball groove and shaft groove in such a manner that they are held by and between these two grooves, and a circulation member capable of defining a ball circulation passage for allowing the balls to circulate endlessly therethrough, wherein a portion of the nut ball groove is formed larger in the effective diameter than the remaining portions of the nut.

3 Claims, 7 Drawing Sheets

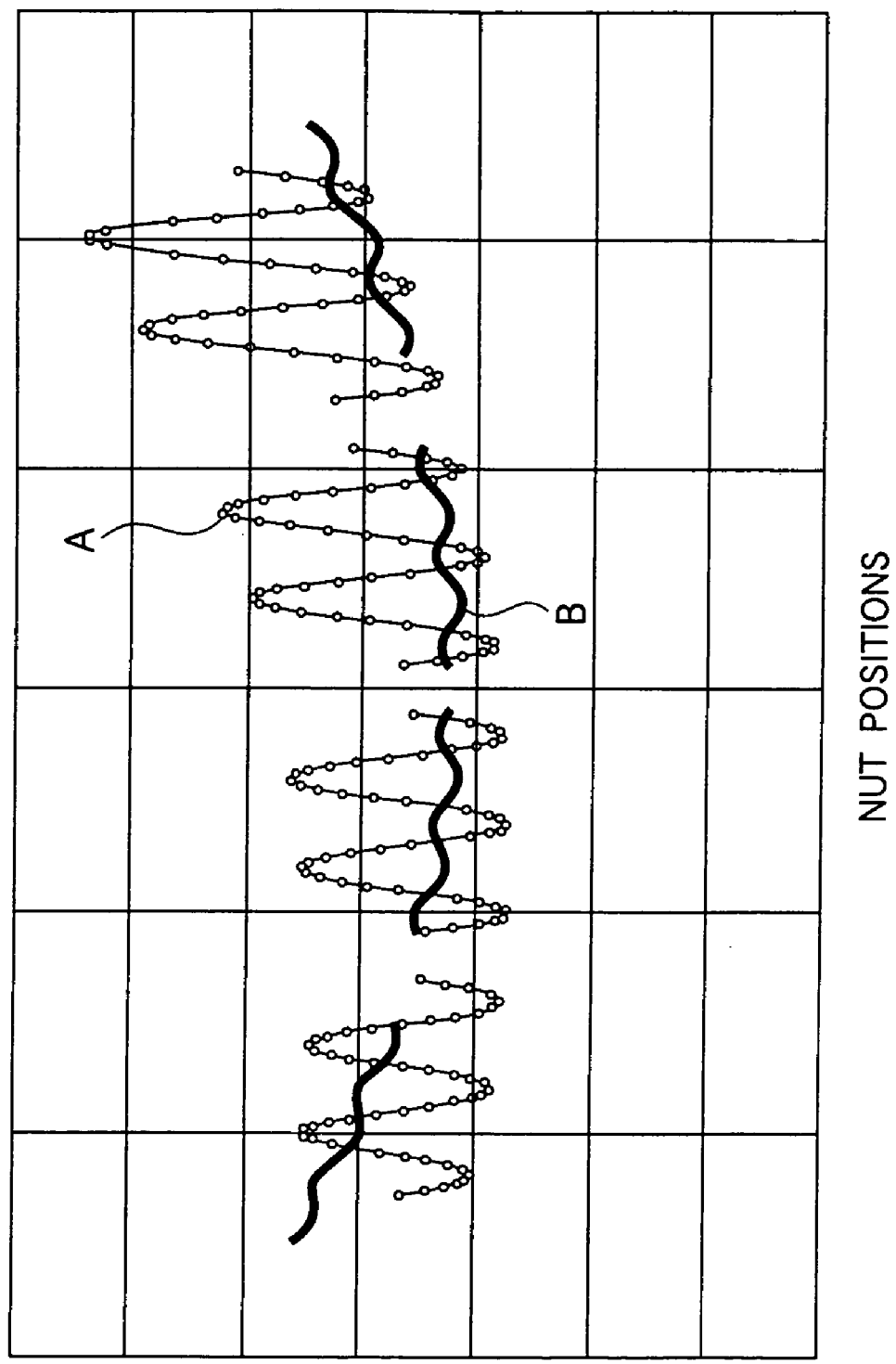

BALL SCREW

This is a divisional of application Ser. No. 10/211,353 filed Aug. 5, 2002 now U.S. Pat. No. 6,925,900 the entire disclosure of which is incorporated herein by reference.

BACKGROUND OF THE INVENTION

The present invention relates to a ball screw used to threadedly engage a shaft and a nut with each other through a large number of balls and, in particular, to a ball screw which can cope with a large rating load and a reduction in noises.

Generally, in order to increase the rigidity and rating load of a ball screw, the ball screw is designed to increase number of balls receiving a load within a nut of the ball screw.

However, in case where the ball screw is designed such that the number of balls in a ball line defined by a single circulation member (a member which allows the balls to circulate endlessly therealong) is increased, the balls are easy to rub against each other in the area where the loads applied to the balls, which has an ill effect on the operation performance of the ball screw. It is also known that such mutual rubbing actions of the balls have an ill effect not only on the operation performance of the ball screw but also on the wear of the balls and ball grooves.

To avoid the above drawbacks, conventionally, there is employed a system in which the closed circuit of the ball line defined by the single circulation member is divided into a plurality of circuits, that is, as shown in FIG. 6, a plurality of ball 2 lines are respectively defined by a plurality of circulation members 6. In FIG. 6, reference character 1 designates a shaft, 2 a ball, and 3 a nut, respectively.

However, in the above-mentioned conventional ball screw, in case where the number of circulation members 6 is increased, there is increased the number of portions where noises are generated, which increases the scale of the noises as a whole. Also, as shown in FIG. 6, the number of times of which the line of balls 2 held by one circulation member 6 is wound around the periphery of the shaft 1, that is, the number of windings of the ball 2 line cannot help being the numbers of windings at intervals of 0.5, for example, 2.5 windings and 3.5 windings. Due to this, in FIG. 6, referring to the respective total numbers of balls 2 in the upper and lower half sections of the shaft 1 when the shaft 1 is viewed from the side surface side thereof, in the upper half section, the ball 2 line is wound 3.0 times and, on the other hand, in the lower half section, the ball 2 line is wound 4.5 times. Thus, there is found a difference of 1.5 windings between the upper and lower half sections. This shows that there is a difference between the upper and lower half sections in the number of balls 2 introduced.

Therefore, in case where the thus structured ball screw receives an external load, the loads applied to the respective balls 2 do not balance well with each other, which can cause the balls 2 to flaking and can shorten the anti-abrasion lives of the balls 2. Also, since there is formed a portion into which the balls 2 are not introduced between the closed circuits of the balls 2 lines the length of the nut 3 cannot be used effectively. In addition, such increase in the number of circulation members 6 also gives rise to an increase in the cost of the ball screw.

In view of the above, conventionally, there is proposed another ball screw which, as shown in FIG. 7, is improved in the balance of the loads to be applied to the balls 2. In the ball screw shown in FIG. 7, of the three circulation members 6 shown in FIG. 6, the centrally-situated circulation member 6 is mounted at a position reversed by 180°. In FIG. 7, referring to the respective total numbers of balls 2 in the upper and lower half sections of the shaft 1 when the shaft 1 is viewed from the side surface side thereof, the line of the balls 2 is wound 3.5 times in the upper half section, whereas the balls 2 line is wound 4.0 times in the lower half section, thereby providing a difference of 0.5 windings between the upper and lower half sections. That is, the difference is reduced by 1.0 windings when compared with the conventional ball screw shown in FIG. 6. Thanks to this, the balance between the upper and lower half sections of the balls 2 line is improved, which makes it possible to prolong the life of the ball screw.

However, since the number of circulation members 6 is equal to that of the ball screw shown in FIG. 6 and there increases the number of portions between the closed circuits of the ball 2 lines into which the balls 2 are not introduced, in case where the number of balls 2 to receive the load is set equal to that of the ball screw shown in FIG. 6, the length of the nut 3 is enlarged.

SUMMARY OF THE INVENTION

The present invention aims at improving the drawbacks found in the above-mentioned conventional ball screws. Accordingly, it is an object of the present invention to provide a ball screw which is low in noise, is excellent in operation performance and load balance, is low in cost, and is simple in structure.

In attaining the above object, according to a first aspect of the present invention, there is provided a ball screw, comprising: a shaft including a spiral-shaped shaft groove having a semicircular-shaped section; a nut including a spiral-shaped nut ball groove corresponding to the shaft groove and having a semicircular-shaped section; a large number of balls rotatably fitted between the nut ball groove and the shaft groove so as to be held by and between the two grooves; and, a circulation member defining a ball circulation passage for allowing the balls to circulate endlessly therealong, wherein a portion of the nut ball groove is formed larger in the effective diameter than the remaining portions of the nut.

According to a second aspect of the present invention, there is provided a ball screw, comprising: a shaft including a spiral-shaped shaft groove having a semicircular-shaped section; a nut including a spiral-shaped nut ball groove corresponding to the shaft groove and having a semicircular-shaped section; a large number of balls rotatably fitted between the nut ball groove and the shaft groove so as to be held by and between the two grooves; and, a circulation member defining a ball circulation passage for allowing the balls to circulate endlessly therealong, wherein a width of a portion of the nut ball groove is formed larger than that of the remaining portions of the nut with the depth of the portion of the nut ball groove remaining.

According to a third aspect of the present invention, there is provided a ball screw as set forth in the first or second aspect of the present invention, wherein the portion of the nut ball groove formed larger than the remaining portions of the nut is disposed in a plurality of portions of the nut.

According to a fourth aspect of the present invention, there is provided a ball screw as set forth in the first or second aspect of the present invention, wherein when a number of a load area is set n, a number of the portion of the nut ball groove formed larger than the remaining portions of the nut is set n-1.

In the conventional structure, when a load is applied to the nut from outside, pressure is applied onto balls existing in the load area to cause the balls to rub against one another so that the balls are likely to wear due to their mutual rubbing actions. On the other hand, in the structure according to the present invention, in the portion of the nut where the effective diameter of the nut ball groove is set larger than the remaining portions thereof, the balls are allowed to escape in the diameter direction of the nut. Thanks to this, the loads to be applied to the balls can be reduced and the rubbing actions of the balls against one another can be eased. Therefore, the wear of the balls due to such mutual rubbing actions of the balls can be reduced and the operation performance of the nut screw can be kept at a good level.

BRIEF DESCRIPTION OF THE DRAWINGS

FIG. 3 is a characteristic view of the relation between the loads to be applied to the balls and the positions of the nut;

DETAILED DESCRIPTION OF THE PREFFERED EMBODIMENTS

Now, description will be given below of an embodiment of a ball screw according to the present invention with reference to the accompanying drawings.

Figure 1:
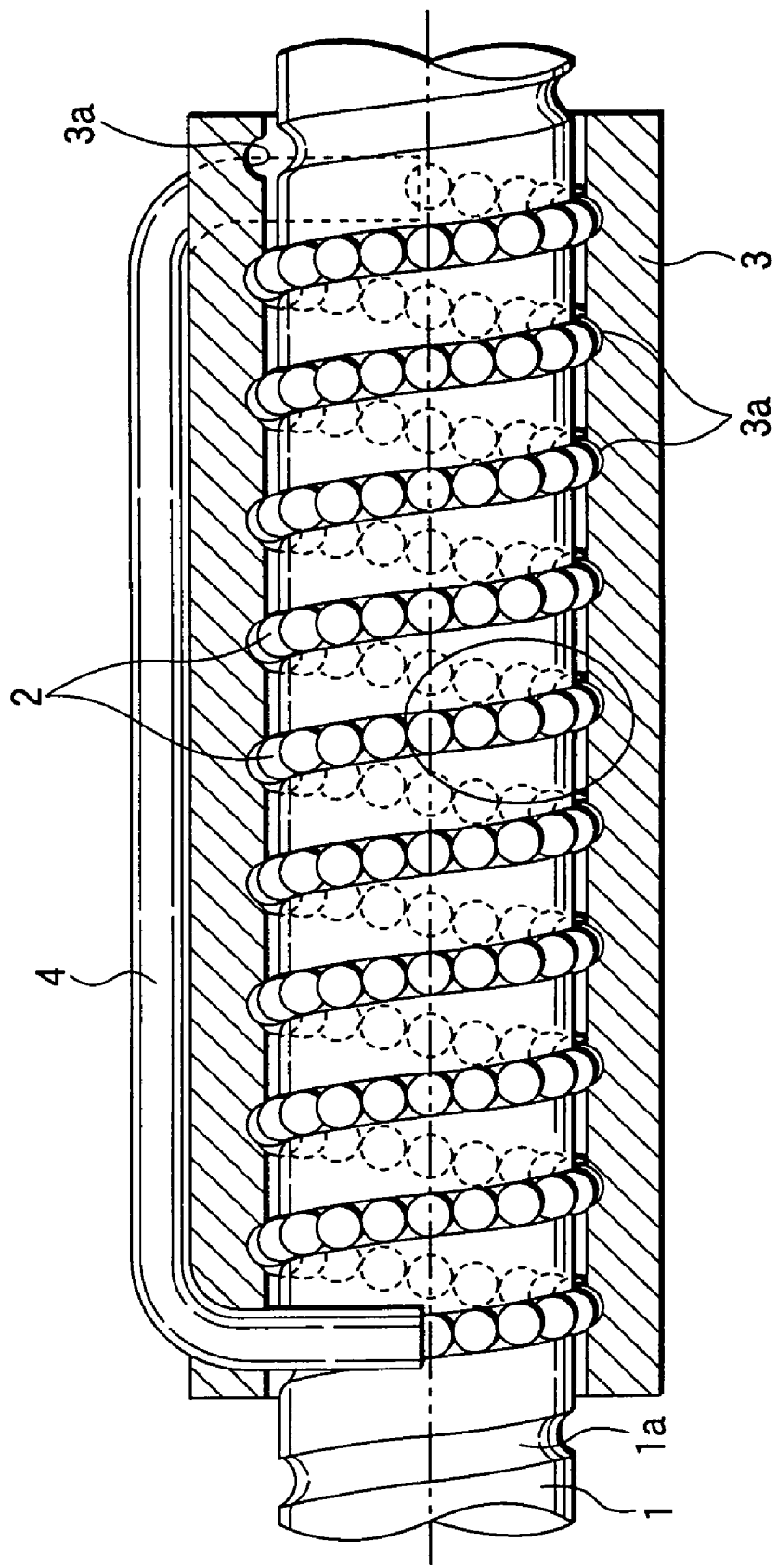
FIG. 1 is a section view of a ball screw according to an embodiment of the present invention.
Figure 2:
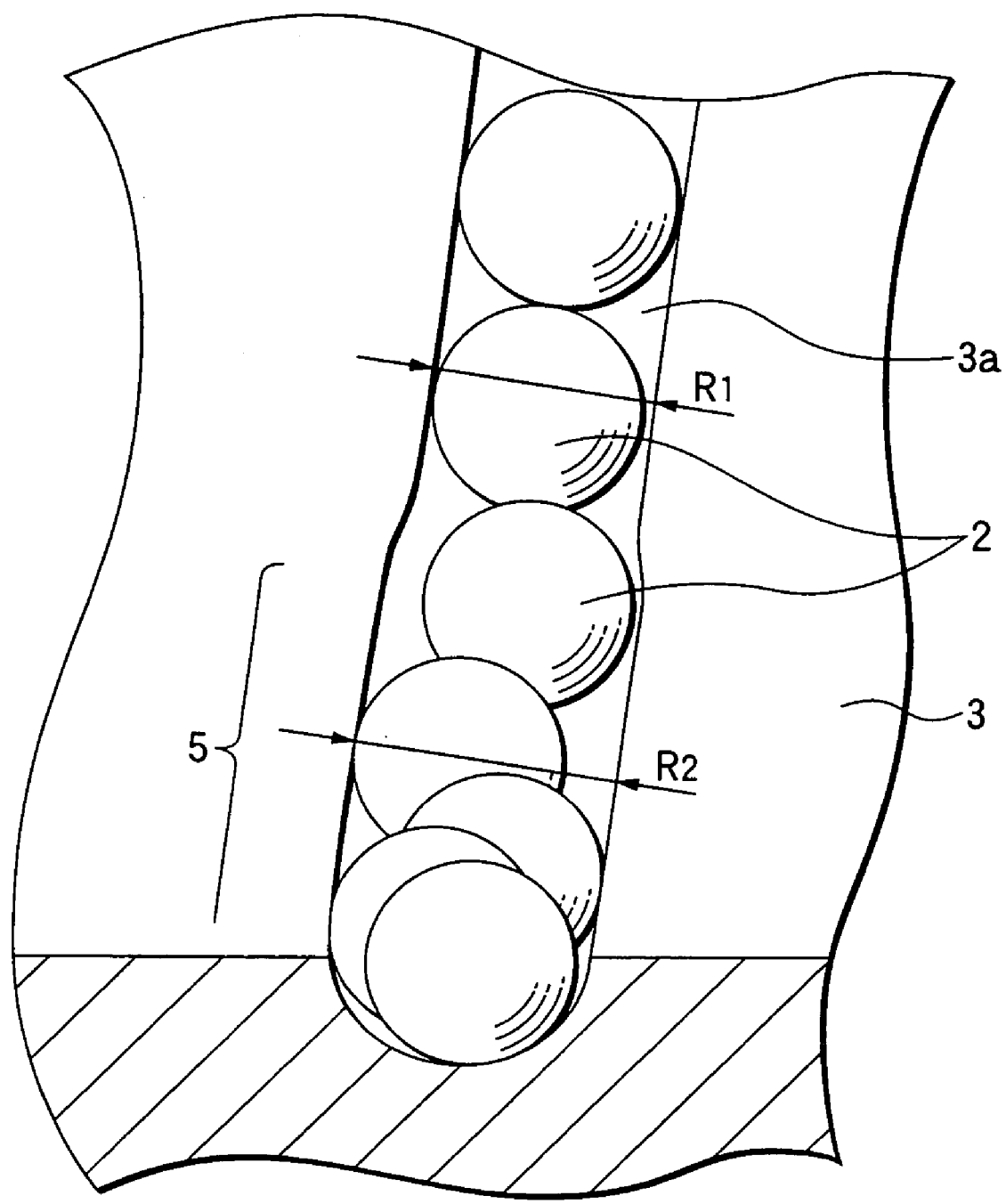
FIG. 2 is an enlarged view of a portion enclosed by an oval mark shown in FIG. 1, when the inner peripheral surface of a nut is viewed from the shaft side.

FIG. 1 is a section view of a ball screw according to the present embodiment of the present invention, FIG. 2 is an enlarged view of a portion enclosed by an oval (O) mark shown in FIG. 1 when the inner peripheral surface of a nut is viewed from the shaft side of the ball screw, and FIG. 3 is a characteristic view of the relation between the ball loads and nut positions.

In FIG. 1, a shaft 1 includes a shaft groove 1a which is formed in a spiral shape and has a semicircular-shaped (Gothic-arch-shaped) section, a large number of balls (steel balls) 2 are fitted into the shaft groove 1a, and a nut ball groove 3a, which is so formed in a nut 3 as to have a spiral shape and also has a semicircular-shaped (Gothic-arch-shaped) section, is threadedly engaged with the balls 2. The two end portions of the line of the balls 2 are respectively contacted with the two end portions of a ball circulation member (a return tube) 4, while the nut 3 includes a closed circuit which is composed of the single circulation member 4 and the line of the balls 2. The circulation member 4 is fixed to the nut 3. Due to the relative rotation between the shaft 1 and nut 3, the balls 2 are allowed to circulate in the closed circuit, whereby the shaft 1 and nut 3 are spirally rotated with respect to each other.

A portion (in FIG. 1, a portion enclosed by an oval) of the nut ball groove 3a of the nut 3, as shown in FIG. 2 as well, is formed such that the ball center diameter of the semicircular shape of the section thereof (the dimension of the diameter of a circle drawn by each of the balls 2 interposed between the ball grooves 1a and 3a of the shaft 1 and nut 3, the effective diameter described in the above) is set slightly larger than that of the remaining portions thereof (for example, 10 μm), with the result that this portion provides a large-diameter portion 5 so formed as to have a width R2 slightly larger than the width R1 of the semicircular-shaped groove of the nut (R1<R2). The degree of an increase in the width R2 of the large-diameter portion 5 over the width R1 should be set such that, even when an external load is applied to the nut 3, the balls 2 can be prevented from receiving the load; that is, the degree should be set not too large. And, the length of the large-diameter portion 5 along the spiral-shaped groove may range from a length equivalent to the lengths of two balls to a length corresponding to a half winding of the ball line along the spiral-shaped groove.

In the conventional structure, when a load is applied to the nut from outside, pressure is applied onto balls existing in the load area to cause the balls to rub against one another so that the balls are likely to wear due to their mutual rubbing actions. On the other hand, in the structure according to the present invention, when a load is applied to the nut 3 from outside, as shown in FIG. 2, in the large-diameter portion 5 of the nut ball groove 3a, the balls 2 are allowed to escape in the diameter direction and the width direction of the nut 3. Thanks to this, the loads to be applied to the balls 2 can be reduced, which makes it possible to ease the mutual rubbing actions between the balls 2. For this reason, even when the external load is applied to the ball screw, the operation performance of the ball screw can be kept at a good level as well as the wear of the balls 2 due to the mutual rubbing actions between them can be reduced.

Also, referring to the respective total numbers of balls 2 which exist in the upper and lower half sections of the shaft 1 in FIG. 1 when the shaft 1 is viewed from the side surface side thereof, the total number of balls 2 existing in the upper half section may be the number corresponding to 4.5 windings and, in the lower half section, the length of the large-diameter portion 5 may be the length equal to or more than the lengths of two balls 2. Therefore, there is eliminated the difference between the upper and lower half sections, which makes it possible to arrange the load balls 2 so as to balance well in the circumferential direction of the shaft 1. As a result of this, the loads to be applied to the respective balls 2 can be made to balance well.

Figure 6:
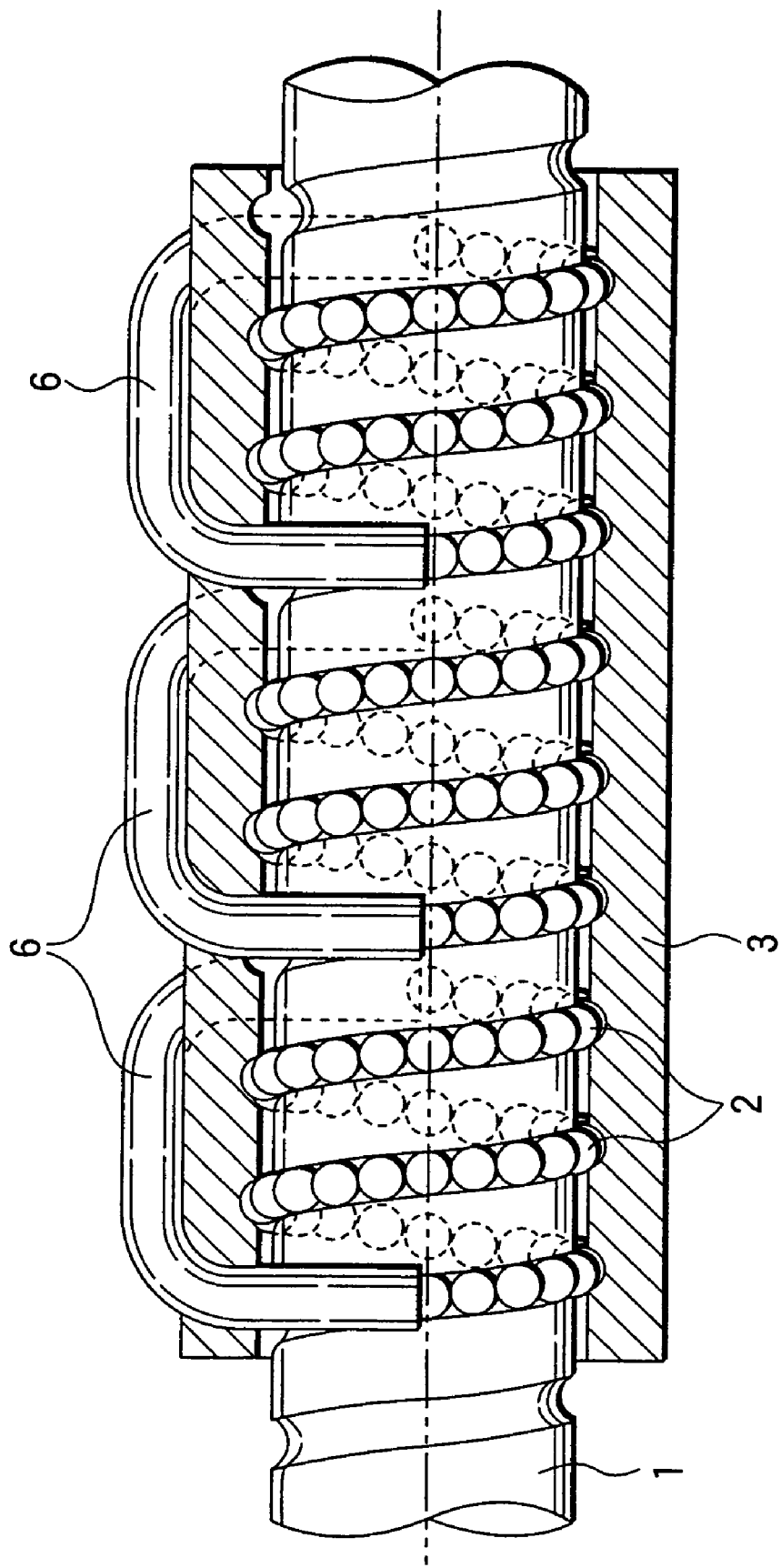
FIG. 6 is a section view of a conventional ball screw.
Figure 7:
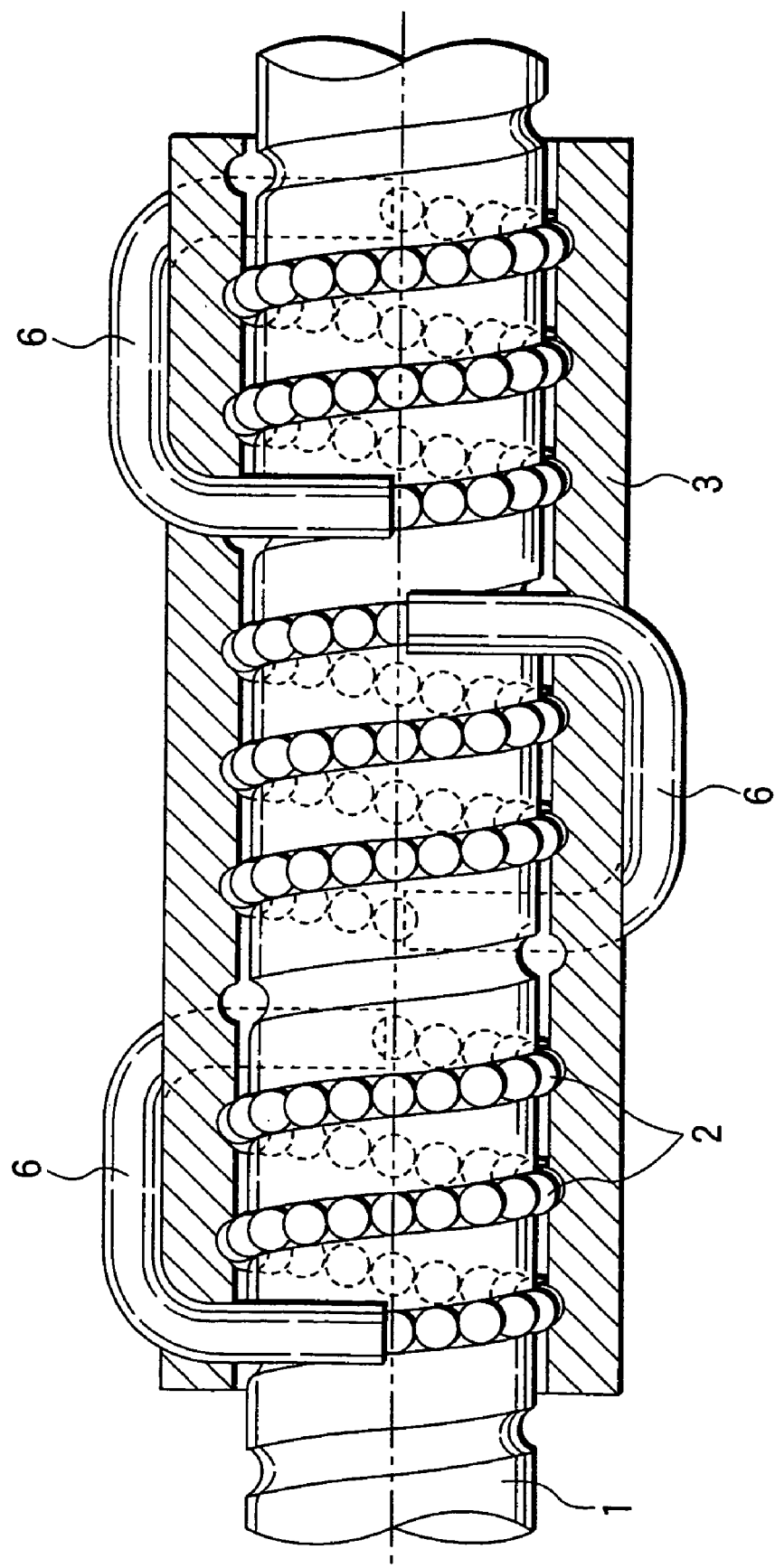
FIG. 7 is a section view of another conventional ball screw which is improved in the load balance.

Here, FIG. 3 shows the difference between the conventional ball screw in which, as shown in FIG. 6, the circulation members 6 are arranged on one side and the ball screw according to the present invention in which the load balls 2 are arranged in a good balance in the relation between the loads to be applied to the balls 2 and the positions of the nut 3 with respect to the shaft 1. In FIG. 3, a fine solid line A expresses the conventional ball screw in which the load balls 2 do not balance well, whereas a bold solid line B expresses the ball screw according to the present invention in which the load balls 2 balance well. In FIG. 3, the degree of variations in the ball loads with respect to the positions of the nut 3 shows the good or poor balance of the loads. In the ball screw according to the present invention (B), when compared with the conventional ball screw (A), not only the variations in the loads per lead but also the variations in the loads in the entire nut 3 are reduced greatly, which shows that the load balance is improved.

Figure 4A:
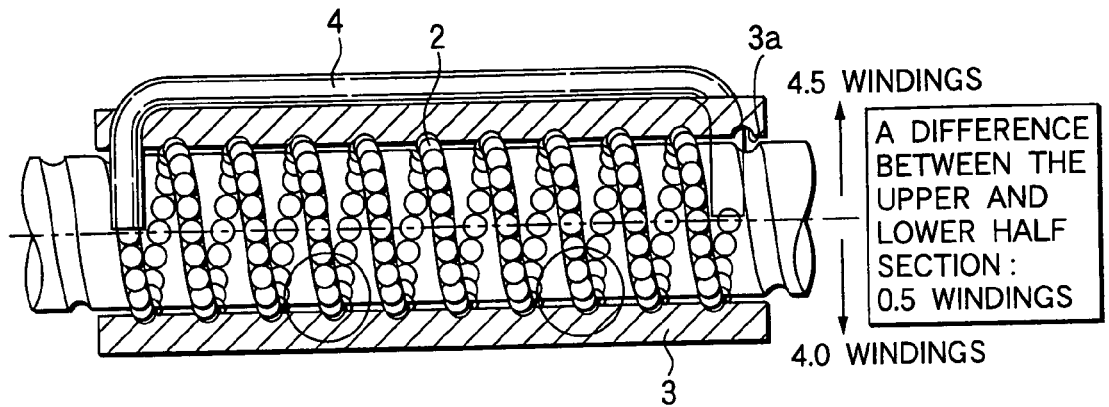
FIGS. 4A to 4C are section views of a ball screw according to embodiments of the present invention.
Figure 4B:
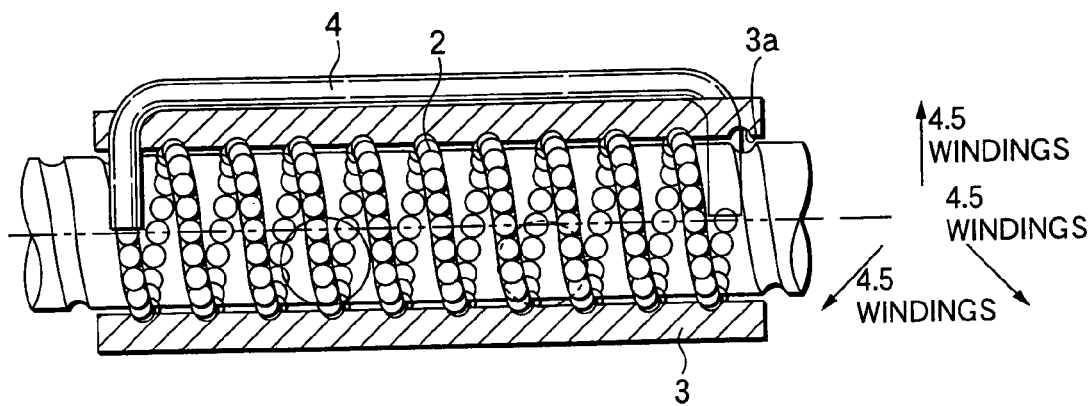
Figure 4C:
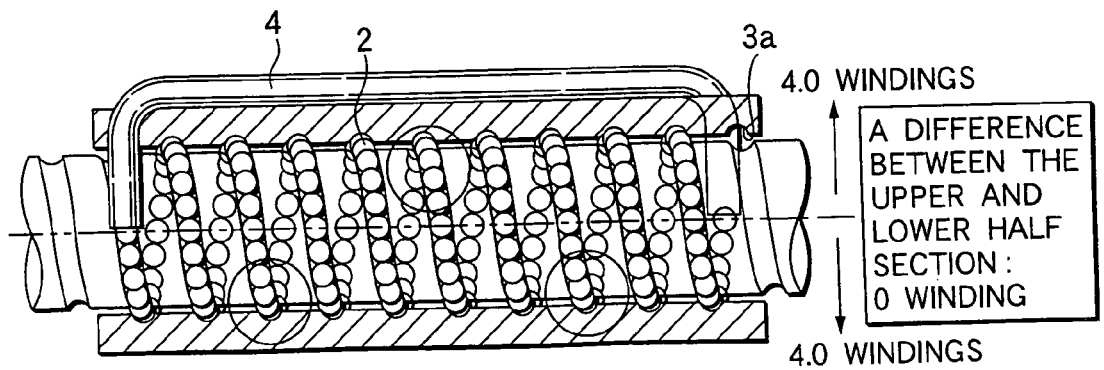

In the present embodiment, since the number of circulation members 4 is one, a reduction in noises can be realized. Also, the large-diameter portion 5 is not limited in number to one but it may be disposed in a plurality of portions; and, the number of large-diameter portions 5 may be decided according to the load balance and the number of balls 2. The position of the large-diameter portion 5 may be set in such a manner that the balls 2 receiving loads balance well. For example, in case where the load area is set for n portions, with the balance in the circumferential direction of the shaft 1 taken into account, the large-diameter portion 5 may be arranged in (n-1) portions. In case where the large-diameter portion 5 is arranged in a plurality of portions, the number of balls to be introduced into one load area can be set arbitrarily, which makes it possible to enhance the operation performance of the ball screw. FIG. 4A shows an embodiment of the present invention having two large-diameter portions 5. In this embodiment, the two large-diameter portions 5 designated by two circles are disposed in an opposite side of the circulation member 4. FIG. 4B shows an embodiment of the present invention having two large-diameter portions 5. In this embodiment, the two large-diameter portions 5 designated by two circles (a full line and a broken line) are disposed in an opposite side of the circulation member 4 and separated from each other in the longitudinal and width direction of the nut 3. According to this construction, the line of the balls 2 is divided into three portions in a circumferential direction of the shaft 1. In this case, it is preferable that the total winding number of the balls 2 is divided not simply but so as to arrange no-loaded portions with the well balance in the circumferential direction of the shaft 1. FIG. 4C shows an embodiment of the present invention having three large-diameter portions 5 designated by three circles. In this embodiment, one of the three large-diameter portions 5 is disposed in an upper half section of the shaft 1, when the shaft 1 is viewed from the side surface side thereof. On the other hand, two of them are disposed in a lower half section and separated from each other in the axial direction of the shaft 1. In this case, it is preferable that the large-diameter portions 5 are divided so as to arrange load balance loaded on the balls 2 with the well balance.

Figure 5A:
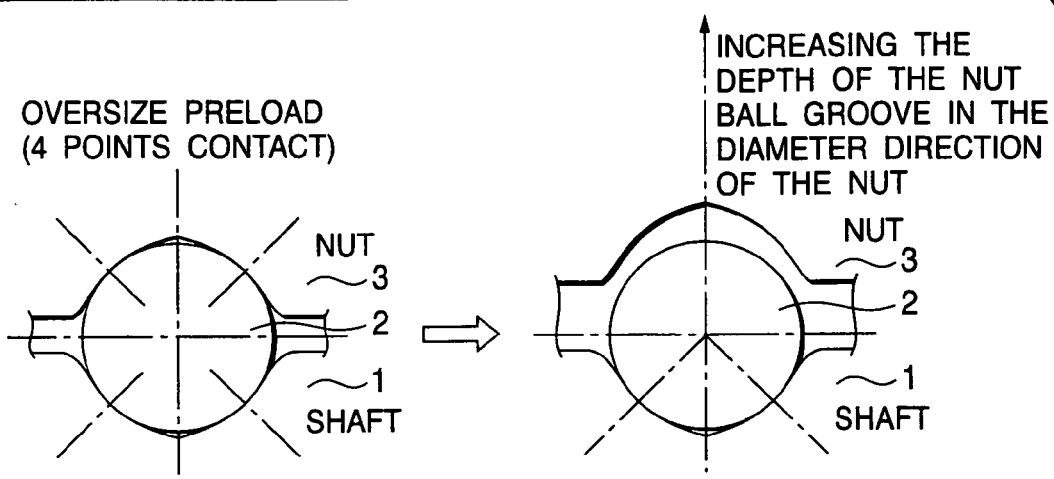
FIGS. 5A to 5C are section views of the ball interposed between the ball nut groove and the shaft groove.
Figure 5B:
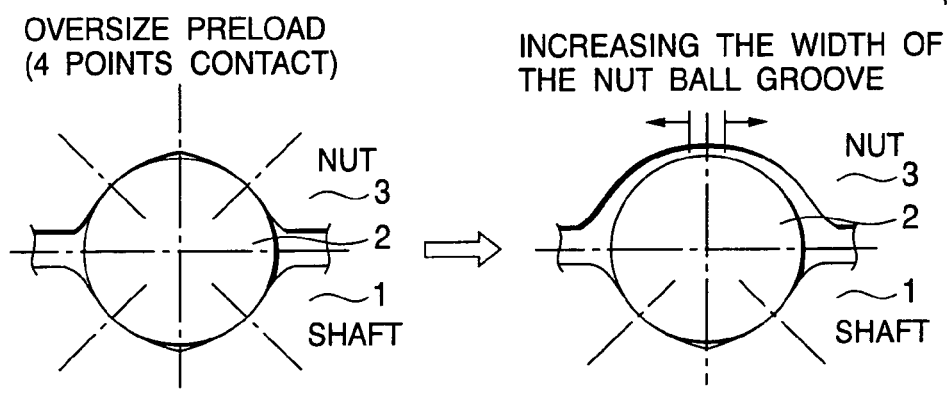
Figure 5C:
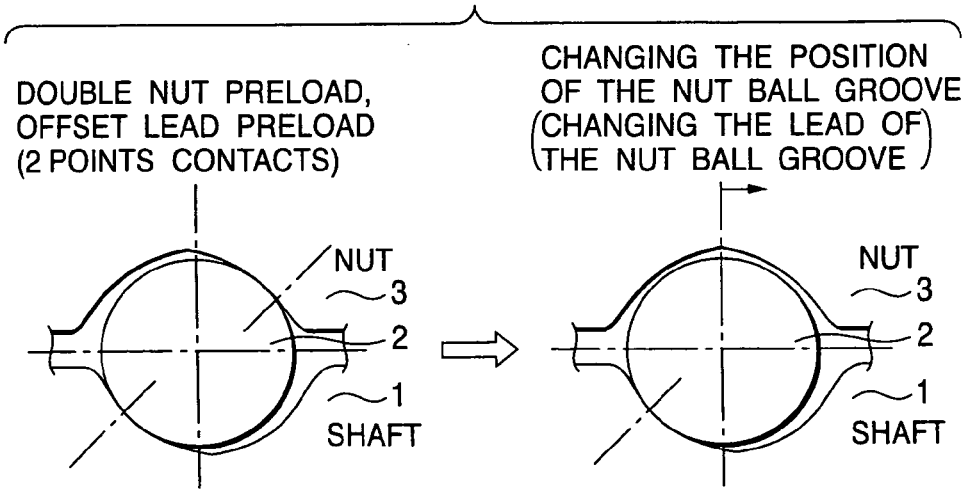

Also, in the present embodiment, there is employed a method in which the effective diameter of the nut ball groove 3a is increased. However, this is not limitative but, for example, in another method in which only the width of the nut ball groove 3a is increased (the depth of the nut ball groove 3a remains unchanged), there can also be expected a similar effect. In addition, for accomplishing the similar effect, it is preferable that a clearance gap is formed between the ball 2 and the nut ball groove 3a due to change the shape or position of the nut ball groove 3a during pre-load or external load is applied. In the right side of FIG. 5A, there is a construction forming a clearance gap between the ball 2 and the nut ball groove 3a due to increase the effective diameter thereof. In details, the depth of the nut ball groove 3a is increased in the diameter direction of the nut without changing the shape thereof. In the right side of FIG. 5B, there is a construction forming a clearance gap between the ball 2 and the nut ball groove 3a due to change the shape in the width direction thereof. In details, the width of the nut ball groove 3a is increased so as to change the shape thereof. In the right side of FIG. 5C, there is a construction forming a clearance gap between the ball 2 and the nut ball groove 3a due to change a lead of the nut ball groove 3a partially. In details, the position of the nut ball groove 3a is changed in the longitudinal direction of the nut without changing the shape of the nut ball groove. This construction is applied to two-point contact type of a ball screw. However, the above constructions shown in FIGS. 5A and 5B can be applied to two-point or four-point contact type of a ball screw. In addition, in the left sides of FIGS. 5A to 5C, there are constructions without changing the shape or position of the nut ball groove.

By the way, in the present embodiment, description has been given of a ball screw of a tube type. However, this is not limitative but, for example, in a ball screw of other type using a different circulation member such as an end cap or a guide plate, there can also be expected a similar effect. Also, to prevent the balls from rubbing against one another, the circulation member can also be used in combination with a retaining piece (a resin-made retainer) which is used while it is inserted between the balls.

As has been described heretofore, according to the present invention, since the nut ball groove of the nut is structured such that the effective diameter of a portion thereof is larger than that of the remaining portions thereof, even when the external load is applied to the ball screw, the loads to be applied to the balls can be reduced and the degree of balls rubbing against one another can be eased. This can reduce the wear of the balls due to the balls' mutual rubbing actions and can keep the operation performance of the ball screw at a good level.

Also, because the number of ball circulation members can be reduced over the conventional ball screw, the amount of working on the nut side for installation of the ball circulation members can be reduced, which makes it possible to reduce the cost of the ball screw and noises.

Further, since the load balls can be arranged so as to balance well in the circumferential direction of the shaft, the length of the nut can be used effectively as well as the effective life of the ball screw can be prolonged.

What is claimed is:
1. A ball screw, comprising:
   a shaft including a spiral-shaped shaft groove having a semicircular-shaped section;
   a nut including a spiral-shaped nut ball groove corresponding to the shaft groove and having a semicircular-shaped section;
   a large number of balls rotatably fitted between the nut ball groove and the shaft groove so as to be held by and between the two grooves; and,
   a circulation member defining a ball circulation passage for allowing the balls to circulate endlessly therealong,
   wherein a portion of the nut ball groove is formed larger in the effective diameter than are the remaining portions of the nut ball groove; and
   wherein a length of the larger-diameter portion along the spiral-shaped nut ball groove is a length equivalent to that of two balls or more and is less than a length corresponding to a half winding of the balls along the spiral-shaped nut ball groove;
   wherein the larger-diameter portion of the nut ball groove is disposed in a plurality of locations of the nut;
   wherein a number of load areas is set as n, and a number of the larger-diameter portions of the nut ball groove is set as n-1; and
   wherein the n-1 larger-diameter portions are arranged in a balanced manner in a circumferential direction of the shaft.

2. The ball screw of claim 1, wherein there are three large diameter portions, one of the large diameter portions is disposed on a side of the shaft near the circulation member and the other two large diameter portions are disposed on a side of the shaft opposite the circulation member.

3. The ball screw of claim 1, a difference between circumferential lengths of the nut ball groove on either side of an arbitrary plane passing through an axial center of the nut is a half of the winding of the balls or less.

* * * * *